(12) United States Patent
Minamikawa et al.

(10) Patent No.: US 9,731,541 B2
(45) Date of Patent: Aug. 15, 2017

(54) LABEL, ADHESIVE LABEL, AND PRINTED PRODUCT

(71) Applicants: TOPPAN PRINTING CO., LTD., Tokyo (JP); SEIKO EPSON CORPORATION, Tokyo (JP)

(72) Inventors: Miho Minamikawa, Tokyo (JP); Hideki Ochiai, Tokyo (JP); Satoshi Gocho, Tokyo (JP); Yoshihiro Koizumi, Suwa (JP); Masaru Takahashi, Suwa (JP); Takakazu Fukano, Suwa (JP)

(73) Assignees: TOPPAN PRINTING CO., LTD., Tokyo (JP); SEIKO EPSON CORPORATION, Tokyo (JP)

( * ) Notice: Subject to any disclaimer, the term of this patent is extended or adjusted under 35 U.S.C. 154(b) by 212 days.

(21) Appl. No.: 14/229,147

(22) Filed: Mar. 28, 2014

(65) Prior Publication Data

US 2015/0273928 A1     Oct. 1, 2015

Related U.S. Application Data

(63) Continuation of application No. PCT/JP2012/068347, filed on Jul. 19, 2012.

(30) Foreign Application Priority Data

Sep. 29, 2011   (JP) ................. 2011-213728

(51) Int. Cl.
*B42D 25/382*   (2014.01)
*B42D 25/00*   (2014.01)
(Continued)

(52) U.S. Cl.
CPC .............. *B42D 25/382* (2014.10); *B32B 3/14* (2013.01); *B32B 7/12* (2013.01); *B32B 27/08* (2013.01);
(Continued)

(58) Field of Classification Search
CPC ....... G09K 19/06; G09K 19/10; B42D 25/382
(Continued)

(56) References Cited

U.S. PATENT DOCUMENTS 6,514,462 B1 *  2/2003  Simons .................... G01K 3/04
                                                              116/206
6,952,504 B2   10/2005  Bi et al.
(Continued)

FOREIGN PATENT DOCUMENTS

JP    56-32513    4/1981
JP    60-69103    4/1985
(Continued)

OTHER PUBLICATIONS

JP 2012144009 A Translation (2012).*
(Continued)

*Primary Examiner* — Kyle Grabowski

(57) ABSTRACT

A label (1) of this invention includes an optical function layer (13) configured to pass light of a certain wavelength, a light absorption layer (15) facing the optical function layer (13) and configured to absorb the light of the wavelength, and a light scattering layer (12) intervening between the optical function layer (13) and the light absorption layer (15) and including hollow bodies configured to scatter the light of the wavelength. The light scattering layer (12) is configured to raise a transmittance at the wavelength upon receiving external heat.

16 Claims, 5 Drawing Sheets

(51) Int. Cl.
- *G06K 19/10* (2006.01)
- *G06K 19/06* (2006.01)
- *B42D 25/36* (2014.01)
- *B32B 7/12* (2006.01)
- *B32B 27/08* (2006.01)
- *B32B 27/32* (2006.01)
- *B32B 27/36* (2006.01)
- *B32B 3/14* (2006.01)
- *G09F 3/00* (2006.01)

(52) U.S. Cl.
CPC ............. *B32B 27/32* (2013.01); *B32B 27/36* (2013.01); *B32B 27/365* (2013.01); *B42D 25/36* (2014.10); *G06K 19/06* (2013.01); *G06K 19/10* (2013.01); *G09F 3/0292* (2013.01); *B32B 2264/108* (2013.01); *B32B 2307/40* (2013.01); *B32B 2307/402* (2013.01); *B32B 2307/41* (2013.01); *B32B 2307/412* (2013.01); *B32B 2307/75* (2013.01); *B32B 2519/00* (2013.01)

(58) Field of Classification Search
USPC .......................................................... 235/468
See application file for complete search history.

(56) References Cited

U.S. PATENT DOCUMENTS

| | | | |
|---|---|---|---|
| 7,656,084 B2 | 2/2010 | Ishida | |
| 8,206,779 B2 | 6/2012 | Suzuki et al. | |
| 8,778,834 B2* | 7/2014 | Endres | B42D 25/328 283/86 |
| 2008/0290178 A1* | 11/2008 | Reynolds | B42D 25/00 235/494 |
| 2010/0264640 A1* | 10/2010 | Lane | B42D 25/29 283/81 |
| 2011/0215561 A1* | 9/2011 | Rosset | B42D 25/29 283/74 |
| 2013/0083142 A1 | 4/2013 | Minamikawa et al. | |

FOREIGN PATENT DOCUMENTS

| | | |
|---|---|---|
| JP | 60-223873 | 11/1985 |
| JP | 61-87734 | 5/1986 |
| JP | 61-185505 | 8/1986 |
| JP | 62-127336 | 6/1987 |
| JP | 63-110208 | 5/1988 |
| JP | 63-135409 | 6/1988 |
| JP | 63-213509 | 9/1988 |
| JP | 4-189196 | 7/1992 |
| JP | 6-187523 | 7/1994 |
| JP | 10-204363 | 8/1998 |
| JP | 2000-293108 | 10/2000 |
| JP | 2002-178675 | 6/2002 |
| JP | 2005-119228 | 5/2005 |
| JP | 2005-266147 | 9/2005 |
| JP | 2012-144009 | 8/2012 |
| JP | 2012144009 A * | 8/2012 |

OTHER PUBLICATIONS

Carbon Black Spectrum (2011).*
International Search Report dated Sep. 18, 2012, in corresponding International Application No. PCT/JP2012/068347.
U.S. Office Action dated May 13, 2015 in related U.S. Appl. No. 14/227,665.
English Abstract of Japanese Publication No. 06-187523, Published Jul. 8, 1994.
PCT International Preliminary Report on Patentability and Written Opinion of the International Searching Authority dated Apr. 10, 2014 in corresponding International Patent Application No. PCT/JP2012/068347.
English Abstract of Japanese Publication No. 06-187523, dated Jul. 8, 1994.

* cited by examiner

LABEL, ADHESIVE LABEL, AND PRINTED PRODUCT

CROSS-REFERENCE TO RELATED APPLICATIONS

This is a Continuation Application of PCT application No. PCT/JP2012/068347, filed on 2012 Jul. 19, which was published under PCT Article 21(2) in Japanese.

This application is based upon and claims the benefit of priority from prior Japanese Patent Application No. 2011-213728, filed on 2011 Sep. 29, the entire contents of which are incorporated herein by reference.

BACKGROUND OF THE INVENTION

1. Field of the Invention

The present invention relates to, for example, a label usable for an anti-counterfeit purpose, and an adhesive label and a printed product including the same.

2. Description of the Related Art

In recent years, counterfeit articles circulating on the market have developed into a serious social issue. As a countermeasure, for example, a label that enables authenticity confirmation is put on an article. Examples of such labels or so-called anti-counterfeit labels are a label including a printed layer formed by a functional ink such as fluorescent ink or OVI (Optically Variable Ink), a label including a printed layer formed by special printing such as microprinting or intaglio printing, a label including a hologram or a diffraction grating, a label in which information is written by magnetic recording, and a label including an IC (Integrated Circuit) tag.

Many anti-counterfeit labels are themselves difficult to counterfeit. However, some anti-counterfeit labels can relatively easily be peeled off articles on which they are put. Such labels may be used dishonestly by peeling such labels off used articles and putting them on counterfeit articles.

Some anti-counterfeit labels employ measures to make such reuse impossible.

For example, an anti-counterfeit label has a notch. Such an anti-counterfeit label is designed to tear from the notch position when ripped off an article on which it is put.

Another anti-counterfeit label uses a base that causes brittle fracture by a relatively small force. Such a label is also designed to break when ripped off an article on which it is put.

Still another anti-counterfeit label includes a brittle layer that causes brittle fracture by a relatively small force. The adhesive strength between the brittle layer and a layer adjacent on the observer side changes depending on the position. When this label is ripped off an article on which it is put, the brittle layer breaks in a pattern corresponding to the adhesive strength distribution. As a result, for example, the brittle layer and the like partially remain on the article with a pattern corresponding to a character string "VOID". A missing portion having a pattern corresponding to the character string "VOID" is formed in the brittle layer and the like of the anti-counterfeit label.

It is impossible or difficult to reuse such an anti-counterfeit label ripped off and released from an article. However, an organic solvent soaking into the adhesive layer or bonding layer may make it possible to release the anti-counterfeit label without damaging the label main body.

Some anti-counterfeit labels employ a technique of making this impossible or difficult.

For example, an anti-counterfeit label uses, as the material of an adhesive layer, a mixture of an adhesive and an additive insoluble in it (for example, see patent literature 1). When this anti-counterfeit label is released using an organic solvent, the surface of the adhesive layer becomes uneven due to the difference in solubility to the organic solvent between the adhesive and the additive.

Another anti-counterfeit label uses a printed layer containing a dye soluble in an organic solvent (for example, see patent literature 2). When this anti-counterfeit label is released using an organic solvent, the dye seeps from the printed layer.

Note that this label can be released without damage to the label main body or seepage of the dye when the surface is heated using a drier or the like. As an anti-counterfeit label taking a measure against the release by heating, there is, for example, an anti-counterfeit label using an adhesive layer containing foaming particles that foams when heated (for example, see patent literature 3).

It is impossible or difficult to reuse these anti-counterfeit labels released using an organic solvent or heat. However, after the expiration date of an article, the possibility that the anti-counterfeit label is removed together with the surface of the article on which it is put needs to be taken into consideration. The above-described measures cannot prevent reuse of an anti-counterfeit label removed in this way.

CITATION LIST

Patent Literatures

Patent Literature 1: Jpn. Pat. Appln. KOKAI Publication No. 2005-266147

Patent Literature 2: Jpn. Pat. Appln. KOKAI Publication No. 10-204363

Patent Literature 3: Jpn. Pat. Appln. KOKAI Publication No. 2000-293108

BRIEF SUMMARY OF THE INVENTION

It is an object of the present invention to make it possible to suppress reuse of a label put on an article after the expiration date of the article.

According to the first aspect of the present invention, there is provided a label comprising an optical function layer configured to pass light of a certain wavelength, a light absorption layer facing the optical function layer and configured to absorb the light of the wavelength, and a light scattering layer intervening between the optical function layer and the light absorption layer and including hollow bodies configured to scatter the light of the wavelength, wherein the light scattering layer is configured to raise a transmittance at the wavelength upon receiving external heat.

According to the second aspect of the present invention, there is provided a label wherein the light scattering layer raises the transmittance at the wavelength when the hollow bodies are broken.

According to the third aspect of the present invention, there is provided the label according to the first or second aspect, wherein the wavelength is in an infrared range, and the optical function layer comprises a black layer.

According to the fourth aspect of the present invention, there is provided the label according to the third aspect, wherein the wavelength is in a near infrared range, and a transmittance difference for a wavelength in one of a wavelength range of 700 to 800 nm of the near infrared range and a wavelength range of 800 to 1,500 nm of the near infrared range is not less than 10% in the optical function layer.

According to the fifth aspect of the present invention, there is provided the label according to any one of the first to fourth aspects, wherein the optical function layer comprises a colored pattern facing part of the light absorption layer while sandwiching the light scattering layer, and the light absorption layer comprises a colored layer having the same color as the optical function layer.

According to the sixth aspect of the present invention, there is provided the label according to any one of the first to fourth aspects, further comprising a light absorption pattern configured to absorb the light of the wavelength, the light absorption pattern intervening between the optical function layer and the light scattering layer or facing the light scattering layer while sandwiching the optical function layer.

According to the seventh aspect of the present invention, there is provided the label according to the sixth aspect, wherein the light absorption pattern and the optical function layer have the same color.

According to the eighth aspect of the present invention, there is provided an adhesive label comprising a label according to any one of the first to seventh aspects, and an adhesive layer facing a major surface of the label on a side of a light absorption layer.

According to the ninth aspect of the present invention, there is provided a printed product comprising a label according to any one of the first to seventh aspects; a print base facing a major surface of the label on a side of a light absorption layer, and an adhesive layer intervening between the label and the print base and configured so that the label can be put on the print base.

According to the present invention, it is possible to suppress reuse of a label put on an article after the expiration date of the article.

In the label according to the first aspect, when processing (to be referred to as "invalidation processing" hereinafter) of crushing the hollow bodies is performed for at least part of the light scattering layer, the transmittance of the light scattering layer at the wavelength (to be referred to as a "first wavelength" hereinafter) rises in that portion. As a result, a spectral characteristic of this label changes before and after the invalidation processing when illuminated with light of the first wavelength.

For this reason, for example, when the invalidation processing is performed after the expiration date of an article on which the label is put, the spectral characteristic when illuminated with light of the first wavelength can be changed. Hence, when the spectral characteristic when illuminated with light of the first wavelength is measured for the label put on an article whose authenticity is unknown, the authenticity of the article can be determined.

In the label according to the second aspect, the first wavelength is in an infrared range. That is, the first wavelength belongs to a range other than the visible light range. In this label, the optical function layer is a black layer.

For example, when the optical function layer covers the entire surface of the light scattering layer, and the near infrared range is a black layer, it is impossible or very difficult to grasp by the naked eye whether the label has undergone the invalidation processing. Hence, in this case, it is difficult to notice that the label has a special structure. It is therefore possible to suppress counterfeiting of the label itself.

In the label according to the third aspect, concerning the label according to the second aspect, the first wavelength is in a near infrared range, a transmittance of the optical function layer at the first wavelength is not less than 30%, and a transmittance difference for a wavelength in one of a wavelength range of 700 to 800 nm of the near infrared range and a wavelength range of 800 to 1,500 nm of the near infrared range is not less than 10% in the optical function layer. That is, the transmittance spectrum of the optical function layer in the near infrared range exhibits a high transmittance at the first wavelength. The transmittance difference for a wavelength in one of the wavelength range of 700 to 800 nm of the near infrared range and the wavelength range of 800 to 1,500 nm of the near infrared range is not more than 10%. It is therefore impossible or difficult for a person who is unaware of use of light of the first wavelength for authenticity determination to discriminate between the label before invalidation processing from that after invalidation processing. For this reason, a person who is committing dishonesty hardly notices that a measure against counterfeiting using the invalidation processing is taken.

In the label according to the fourth aspect, concerning the label according to any one of the first to third aspects, the optical function layer comprises a colored pattern, and the light absorption layer comprises a colored layer having the same color as the optical function layer. As described above, in this label, the light absorption layer is visualized in at least part of the label by the above-described invalidation processing. If the pattern formed by the optical function layer and the light absorption layer have the same color, it is impossible or very difficult to observe the pattern formed by the optical function layer after the processing. For example, when the optical function layer is formed into a one- or two-dimensional code pattern, observation of the code can be made impossible by the invalidation processing. As a result, the observer can clearly grasp by the naked eye that the label has undergone the invalidation processing. It is therefore possible to suppress an act of conducting counterfeiting by putting the label again.

The label according to the fifth aspect further comprises a light absorption pattern configured to absorb the light of the first wavelength. The light absorption pattern can intervene between the optical function layer and the light scattering layer or face the light scattering layer while sandwiching the optical function layer.

Employing this arrangement, when the label is observed at the first wavelength, an image corresponding to the light absorption pattern is observed. On the other hand, after the invalidation processing is performed, the image corresponding to the light absorption pattern cannot be observed due to absorption of light of the first wavelength by the light absorption layer. For this reason, when this arrangement is employed, authenticity determination can be performed relatively easily based on observation of the image at the first wavelength.

In the label according to the sixth aspect, concerning the label according to the fifth aspect, the light absorption pattern and the optical function layer have the same color. For this reason, when the label is observed by the naked eye, the existence of the light absorption pattern is hardly noticed. Hence, when this arrangement is employed, counterfeiting of the label itself can be suppressed.

An adhesive label according to the seventh aspect includes a label according to any one of the first to sixth aspects. The adhesive label is in a form usable when putting the label on an article.

A printed product according to the eighth aspect includes a label according to any one of the first to sixth aspects. The possibility that the label on the printed product is reused after its expiration date is low.

DETAILED DESCRIPTION OF THE INVENTION

Figure 1:
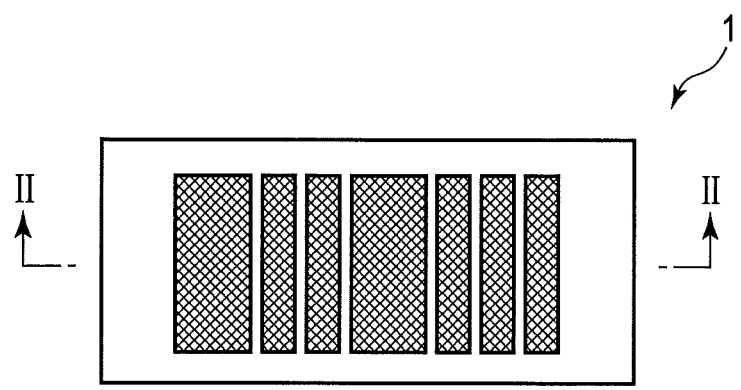
FIG. 1 is a plan view schematically showing a label according to an embodiment of the present invention.

An embodiment of the present invention will now be described in detail with reference to the accompanying drawings. Note that the same reference numerals denote constituent elements having the same or similar functions throughout the drawings, and a repeated description thereof will be omitted. "Near infrared range" here indicates a wavelength range of 700 to 1,500 nm.

Figure 2:
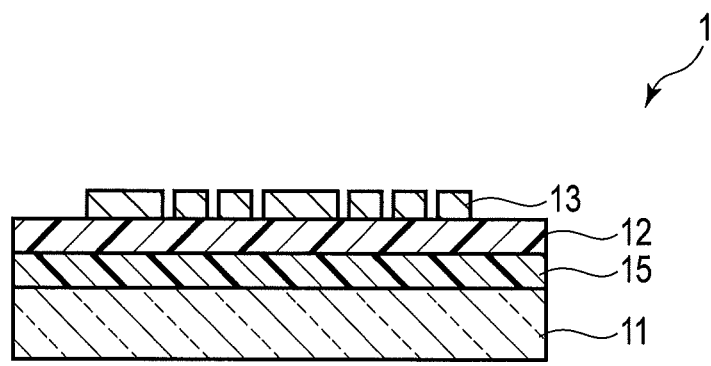
FIG. 2 is a sectional view of the label shown in FIG. 1 taken along a line II-II.

FIG. 1 is a plan view schematically showing a label according to an embodiment of the present invention. FIG. 2 is a sectional view of the label shown in FIG. 1 taken along a line II-II.

A label 1 shown in FIGS. 1 and 2 includes a base 11, a light absorption layer 15, a light scattering layer 12, and an optical function layer 13. The light absorption layer 15, the light scattering layer 12, and the optical function layer 13 are stacked on the base 11 in this order. The label 1 has a front surface on the side of the optical function layer 13 and a back surface on the side of the base 11.

The optical function layer 13, the light scattering layer 12, and the light absorption layer 15 may be stacked on the base 11 in this order. In this case, the label 1 has a front surface on the side of the base 11 and a back surface on the side of the light absorption layer 15.

The base 11 is, for example, a film made of a resin. As the resin, for example, plastics such as polyethylene terephthalate, polyethylene naphthalate, polypropylene, polycarbonate, and polyethylene are usable. The base is typically transparent but may be opaque like aluminum foil. However, when the label 1 has the front surface on the side of the base 11, a material that passes light of a first wavelength or typically light of a first wavelength and a second wavelength different from each other is used as the base 11.

The base 11 can have a single layer structure or a multilayer structure. The base 11 can be omitted.

The light absorption layer 15 is provided on one major surface of the base 11.

The light absorption layer 15 absorbs light of the first wavelength. More specifically, the absorbance of the light absorption layer 15 at the first wavelength is higher than that of the light scattering layer 12 at the first wavelength and that of the optical function layer 13 at the first wavelength immediately after the manufacture of the label 1. The absorbance of the light absorption layer 15 at the first wavelength is, for example, 70% or more and typically 90% or more.

When the first wavelength is in the near infrared range, the light absorption layer 15 contains, for example, a near infrared absorbent and a resin. As the near infrared absorbent, for example, carbon black used in a process india ink is usable. As the resin, for example, a material generally used in a process ink is usable.

The light absorption layer 15 is formed by, for example, a printing method. Examples of the printing method are offset printing, gravure printing, screen printing, and flexographic printing. The thickness of the light absorption layer 15 falls within the range of, for example, 0.5 to 10 μm, and typically falls within the range of 0.5 to 2 μm.

The light scattering layer 12 is provided on the light absorption layer 15. The light scattering layer 12 contains hollow bodies that scatter light of the first wavelength. More specifically, the light scattering layer 12 scatters light of the first wavelength at least during a period from completion of the label 1 to application of invalidation processing. The light scattering layer 12 is configured to, when processing of breaking the hollow bodies is performed, increase the transmittance at the first wavelength at the position where the processing has been performed.

Immediately after the manufacture of the label 1, a transmittance T1 of the light scattering layer 12 with respect to light of the first wavelength falls within the range of, for example, 0% to 50%, and typically falls within the range of 20% to 40%. After invalidation processing, a transmittance T2 of the light scattering layer 12 with respect to light of the first wavelength falls within the range of, for example, 60% to 100%, and typically falls within the range of 70% to 90%. The ratio of the transmittance T2 to the transmittance T1 is, for example, 1.2 or more, and typically falls within the range of 1.75 to 4.5.

An example of the hollow bodies contained in the light scattering layer 12 is an organic polymer having a hollow structure. A composition and manufacturing method of such an organic polymer are described in, for example, Jpn. Pat. Appln. KOKAI Publication No. 56-32513, 61-185505, 60-69103, 63-213509, 63-135409, 60-223873, 63-110208, 61-87734, or 62-127336.

Each of the hollow bodies contained in the light scattering layer 12 typically has a core component and a shell component surrounding it. The core component is formed using, for example, methacrylic acid, or methacrylic acid and another monomer. The shell component is formed using, for example, styrene. The particle diameter of the hollow bodies is, for example, 0.1 to 5 μm and, typically 0.3 to 1 μm.

A polymer that holds hollow bodies is typically an aqueous polymer having film forming properties. This polymer is typically synthesized by emulsion polymerization, solution polymerization, or bulk polymerization. A polymer that holds hollow bodies has such plasticity that does not impede breakage of the hollow bodies in invalidation processing (to be described later). The glass transition point of an aqueous polymer is, for example, 100° C. or less, and typically falls within the range of −80° C. to 25° C.

Examples of the aqueous polymer are water-dispersible polymers and water-soluble polymers. Water-dispersible polymers are dispersible in water. Water-soluble polymers are soluble in water.

Examples of monomers that form water-dispersible polymers are ethyl acrylate (EA), butyl acrylate (BA), 2-ethylhexyl acrylate (2EHA), and butadiene. Each of those monomers can form a homopolymer by itself, or form a copolymer together with one or more other monomers. A particularly preferable polymer is a polymer obtained by reaction between hexamethylene diisocyanate and polycarbonate polyol.

Examples of monomers that form water-soluble polymers are carboxylic acid derivatives of monomers exemplified for the water-dispersible polymers. Examples of the derivatives are acrylic acid (Aa), methacrylic acid, monomethyl itaconic acid (MMI), and 2-carboxyethyl acrylate. Polymers formed from those derivatives become soluble in water by changing at least some of the carboxy groups in monomers to a form of an alkali metal salt, an amine salt, or an ammonium salt.

The mass ratio of the hollow bodies in the light scattering layer 12 and the polymer that holds the hollow bodies falls within the range of, for example, 1:1 to 1:100. The light scattering layer 12 may further contain a plasticizer, a wetting agent, an antifoaming agent, a thickener, an emulsifying agent, and a wax such as carnauba wax, or paraffin wax.

The light scattering layer 12 has light scattering properties and normally takes on a white color. The light scattering layer 12 hides at least part of the light absorption layer 15 at least during a period from completion of the label 1 to application of invalidation processing.

The light scattering layer 12 is formed by, for example, a coating method. This coating can be performed using, for example, an air-knife coater, roll coater, spray coater, gravure coater, micro gravure coater, or bar coater. The film thickness of the light scattering layer 12 falls within the range of, for example, 5 to 20 μm, and typically falls within the range of 5 to 15 μm.

The optical function layer 13 is provided on the light scattering layer 12. The optical function layer 13 passes light of the first wavelength. The transmittance of the optical function layer 13 with respect to light of the first wavelength is, for example, 30% or more, and typically falls within the range of 30% to 60%.

In the example shown in FIGS. 1 and 2, the optical function layer 13 is formed in a pattern. FIGS. 1 and 2 illustrate an example in which the pattern of the optical function layer 13 forms a one-dimensional code. The pattern may form a two-dimensional code. Alternatively, the pattern may form another pattern such as a character, a symbol, a design, or a graphic.

The optical function layer 13 may be colored. For example, the optical function layer 13 may be a colored pattern. When the optical function layer 13 is a colored pattern, the optical function layer 13 and the light absorption layer 15 preferably have the same color. If the pattern formed by the optical function layer and the light absorption layer have the same color, it is impossible or very difficult to observe the pattern formed by the optical function layer after the invalidation processing. As a result, the observer can clearly grasp by the naked eye that the label has undergone the invalidation processing. It is therefore possible to psychologically suppress an act of conducting counterfeiting by putting the label again.

The optical function layer 13 is typically a black layer. For example, when the optical function layer 13 covers the entire surface of the light scattering layer 12, and the optical function layer 13 is a black layer, it is impossible or very difficult to grasp by the naked eye whether the label has undergone the invalidation processing. Hence, in this case, it is difficult to notice that the label has a special structure. It is therefore possible to suppress counterfeiting of the label itself.

Note that "black" here indicates that the reflectance is 10% or less for all light components whose wavelengths fall within the range of 400 to 700 nm when the intensity of specular reflected light is measured.

When the first wavelength is within the near infrared range, a material whose transmittance at the first wavelength is 30% or more and in which the transmittance difference for a wavelength in one of the wavelength range of 700 to 800 nm of the near infrared range and the wavelength range of 800 to 1,500 nm of the near infrared range is 10% or more may be used as the optical function layer 13. That is, as for the transmittance spectrum in the near infrared range, the optical function layer 13 may exhibit a high transmittance at the first wavelength and a low transmittance at other wavelengths. For example, the optical function layer 13 is assumed to have such an optical characteristic. In this case, the second wavelength is also assumed to be in the near infrared range, and the transmittance of the optical function layer 13 at the second wavelength is assumed to be lower than that of the optical function layer 13 at the first wavelength; for example, the difference from the transmittance of the optical function layer 13 at the first wavelength is 10% or more.

The optical function layer 13 having the above-described optical characteristic, that is, the optical characteristic of selectively passing light in a partial wavelength range of light in the near infrared range and absorbing the remaining light contains, for example, a predetermined near infrared absorbent and a resin. This near infrared absorbent absorbs, for example, light of the second wavelength. As the near infrared absorbent, for example, at least one material selected from the group consisting of phthalocyanine compounds, naphthalocyanine compounds, anthraquinone compounds, giimonium compounds, and cyanine compounds is usable. As the resin, for example, a material generally used in a process ink is usable.

The near infrared absorbent used here typically has an absorption spectrum in the near infrared range different from the near infrared absorbent used in the light absorption layer 15. For example, the near infrared absorbent used here has a lower absorbance with respect to light of the first wavelength as compared to the near infrared absorbent used in the light absorption layer 15. Alternatively, as the near infrared absorbent, a compound exemplified as the near infrared absorbent that the light absorption layer 15 can contain may be used.

The optical function layer 13 is formed by, for example, a printing method. Examples of the printing method are offset printing, gravure printing, screen printing, and flexographic printing. The thickness of the optical function layer 13 falls within the range of, for example, 0.5 to 10 μm, and typically falls within the range of 1 to 5 μm.

Authenticity determination of the label 1 described above is typically done by mechanical reading. For example, the authenticity determination can be performed using a sensor capable of detecting light in a specific wavelength range or a CCD (Charge Coupled Device) camera including a bandpass filter that passes light in a predetermined wavelength range.

When the label 1 shown in FIGS. 1 and 2 is illuminated with light of the first wavelength, this light passes through the optical function layer 13 and is scattered by the light scattering layer 12. Hence, in this case, when illuminated with light of the first wavelength, the label 1 exhibits a spectral characteristic unique to the optical function layer 13 based on the scattered light from the light scattering layer 12. This spectral characteristic is a specific characteristic corresponding to the detailed structure of the label 1. Hence, the authenticity of the label 1 can be determined by measuring the spectral characteristic.

In addition, invalidation processing to be described below can be performed for the label 1. When this processing is performed, dishonest reuse of the label 1 can be suppressed.

Figure 3:
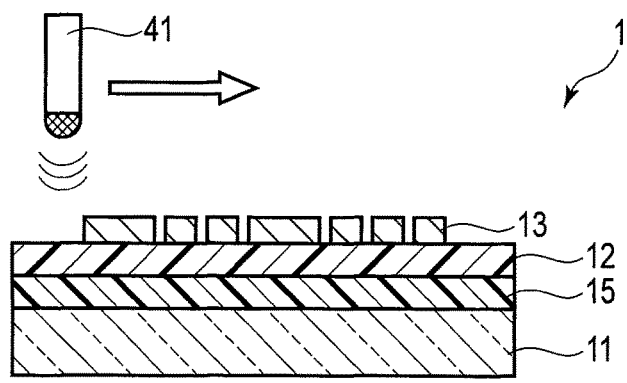
FIG. 3 is a view schematically showing an example of an invalidation processing method of the label shown in FIGS. 1 and 2.
Figure 4:
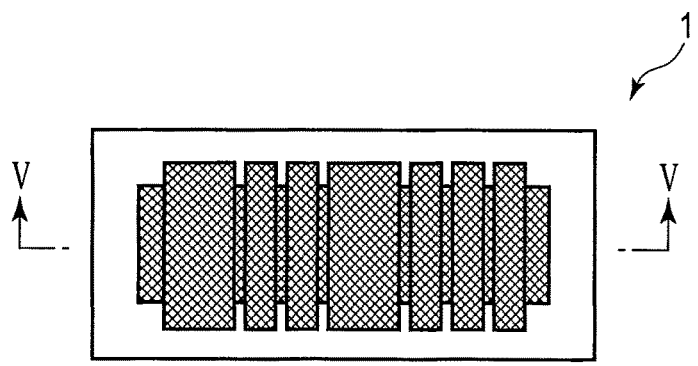
FIG. 4 is a plan view schematically showing an example of a label that has undergone invalidation processing.
Figure 5:
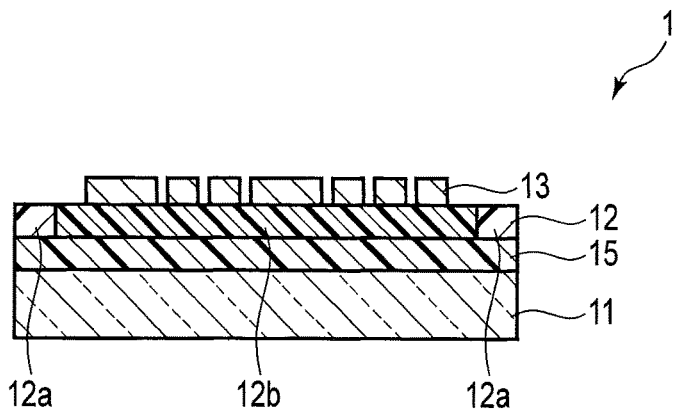
FIG. 5 is a sectional view of the label shown in FIG. 4 taken along a line V-V.

FIG. 3 is a view schematically showing an example of the invalidation processing method of the label shown in FIGS. 1 and 2. FIG. 4 is a plan view schematically showing an example of a label that has undergone invalidation processing. FIG. 5 is a sectional view of the label shown in FIG. 4 taken along a line V-V.

In the invalidation processing method shown in FIG. 3, a thermal head 41 is brought into contact with the label 1, thereby heating at least part of the light scattering layer 12. This breaks at least some of the hollow bodies contained in the heated portion of the light scattering layer 12.

When this invalidation processing is performed, the transmittance of the light scattering layer 12 at the first wavelength rises at a position where the thermal head 41 comes into contact with the label 1. As a result, as shown in FIG. 5, a first region 12a where the transmittance of the light scattering layer 12 at the first wavelength remains the same as that before the invalidation processing and a second region 12b where the transmittance of the light scattering layer 12 at the first wavelength is higher than that before the invalidation processing are formed in the light scattering layer 12.

In a portion of the label 1 corresponding to the second region 12b, light of the first wavelength passes through both the optical function layer 13 and the light scattering layer 12. The light of the first wavelength is absorbed by the light absorption layer 15.

Hence, in this case, when illuminated with light of the first wavelength, the portion of the label 1 corresponding to the second region 12b mainly exhibits a spectral characteristic resulting from absorption of the light absorption layer 15. As a result, in this portion, it is impossible or very difficult to detect the spectral characteristic unique to the optical function layer 13 in this portion. That is, the spectral characteristic of this portion differs before and after the invalidation processing. Hence, it is possible to determine based on the difference in the spectral characteristic whether the label 1 has undergone the invalidation processing.

As described above, the hollow bodies in the light scattering layer 12 can be broken by, for example, applying heat/and or pressure to the label 1. Alternatively, the hollow bodies may be broken physically using a microneedle or the like.

Breakage of the hollow bodies in the light scattering layer 12 is an irreversible change. Hence, once having undergone the invalidation processing, the label 1 cannot return to the state before the processing. For this reason, when the above processing is performed for the label 1, dishonest reuse of the label 1 can reliably be suppressed.

Authenticity determination of the label 1 may be done using light of a plurality of wavelengths. For example, authenticity determination of the label 1 may be performed using light of the first wavelength and light of the second wavelength different from the first wavelength. Alternatively, authenticity determination of the label 1 may be performed using light of the first wavelength and light of two or more wavelengths different from the first wavelength. The number of wavelengths used for authenticity determination falls within the range of, for example, 1 to 5, and preferably falls within the range of 2 to 5. If the number of wavelengths used for authenticity determination is too large, the time required for authenticity determination of the label 1 may be excessively long.

The above-described label 1 can be variously modified.

Figure 6:
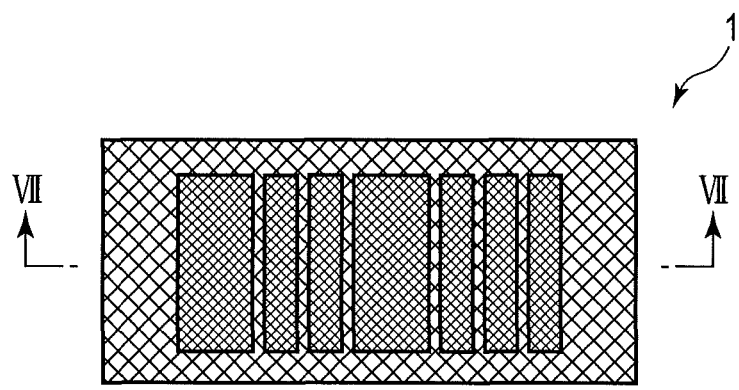
FIG. 6 is a plan view schematically showing a modification of the label shown in FIGS. 1 and 2.
Figure 7:
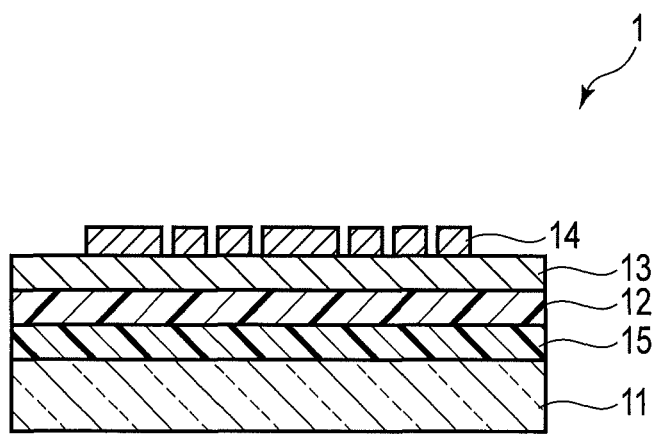
FIG. 7 is a sectional view of the label shown in FIG. 6 taken along a line VII-VII.

FIG. 6 is a plan view schematically showing a modification of the label shown in FIGS. 1 and 2. FIG. 7 is a sectional view of the label shown in FIG. 6 taken along a line VII-VII.

The label 1 shown in FIGS. 6 and 7 has the same structure as the label described with reference to FIGS. 1 to 5 except that the optical function layer 13 covers the entire major surface of the light scattering layer 12, and the label 1 further includes a light absorption pattern 14 facing the light scattering layer 12 while sandwiching the optical function layer 13 between them.

The light absorption pattern 14 absorbs light of the first wavelength. As the material of the light absorption pattern 14, for example, the same materials explained above for the light absorption layer 15 are usable.

The light absorption pattern 14 preferably has the same color as the optical function layer 13 or a light color as long as it exhibits a sufficient absorbance with respect to light of the first wavelength. This makes it difficult to notice the existence of the light absorption pattern 14 when the label 1 is observed by the naked eye.

The light absorption pattern 14 is preferably distributed all over a region corresponding to the light scattering layer 12. This can make it difficult to analyze the spectral characteristic of the optical function layer 13.

The light absorption pattern 14 is formed by, for example, a printing method. Examples of the printing method are offset printing, gravure printing, screen printing, and flexographic printing. Alternatively, the light absorption pattern 14 may be formed using a thermal transfer ribbon, inkjet printing, or laser printing. The thickness of the light absorption pattern 14 falls within the range of, for example, 0.5 to 10 μm, and typically falls within the range of 0.5 to 2 μm.

The label 1 shown in FIGS. 6 and 7 also exhibits a difference in spectral characteristic before and after the above-described invalidation processing when illuminated with light of the first wavelength. Hence, authenticity determination can be done by detecting the difference in the spectral characteristic.

Figure 8:
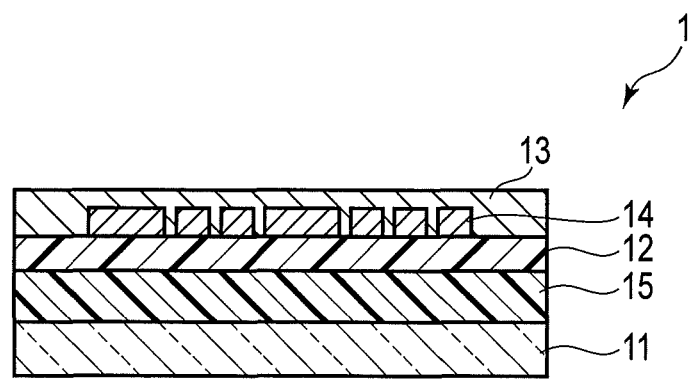
FIG. 8 is a sectional view schematically showing another modification of the label shown in FIGS. 1 and 2.

FIG. 8 is a sectional view schematically showing another modification of the label shown in FIGS. 1 and 2. The label 1 shown in FIG. 8 has the same structure as the label described with reference to FIGS. 6 and 7 except that the light absorption pattern 14 intervenes between the optical function layer 13 and the light scattering layer 12.

The label 1 shown in FIG. 8 also exhibits a difference in spectral characteristic before and after the above-described invalidation processing when illuminated with light of the first wavelength. Hence, authenticity determination can be done by detecting the difference in the spectral characteristic.

Additionally, in the label 1 shown in FIG. 8, it is possible to make the existence of the light absorption pattern 14 unnoticeable by forming the optical function layer 13 as a colored layer, and in particular, forming the optical function layer 13 as a black layer.

An adhesive label and a printed product including the above-described label 1 will be described next.

Figure 9:
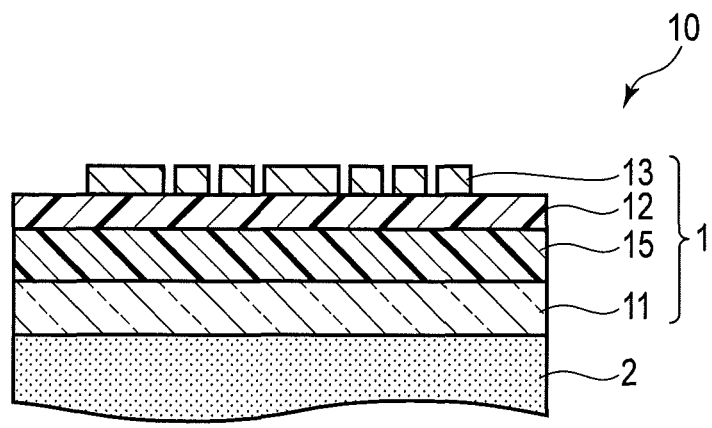
FIG. 9 is a sectional view schematically showing an example of an adhesive label.

FIG. 9 is a sectional view schematically showing an example of an adhesive label.

An adhesive label 10 shown in FIG. 9 includes the label 1 described with reference to FIGS. 1 and 2, and an adhesive layer 2. The adhesive layer 2 is provided on the back surface of the label 1.

The adhesive label 10 is put on, for example, an article desired to be confirmed as authentic. Note that the adhesive label 10 may further include a release paper that releasably covers the surface of the adhesive layer 2.

Figure 10:
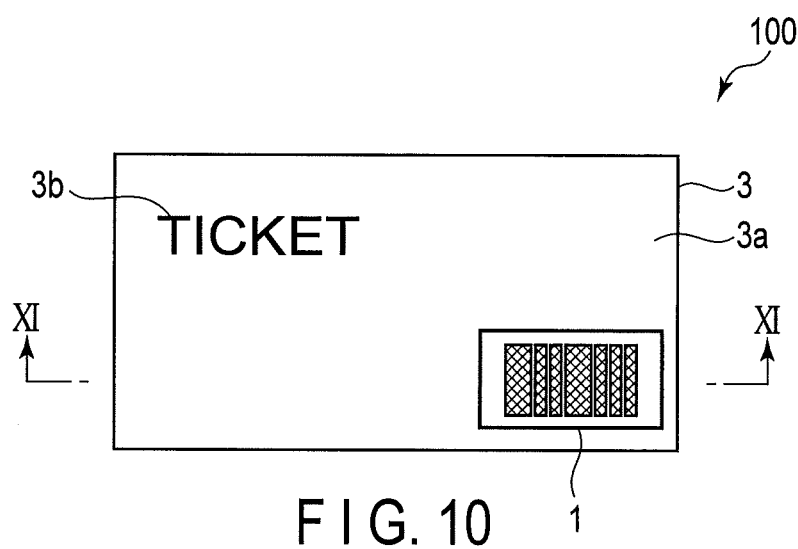
FIG. 10 is a plan view schematically showing an example of a printed product.
Figure 11:
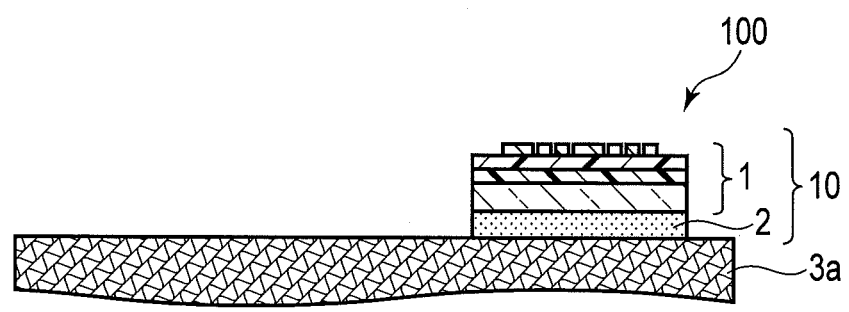
FIG. 11 is a sectional view of the printed product shown in FIG. 10 taken along a line XI-XI.

FIG. 10 is a plan view schematically showing an example of a printed product. FIG. 11 is a sectional view of the printed product shown in FIG. 10 taken along a line XI-XI.

A printed product 100 shown in FIGS. 10 and 11 includes the label 1 described with reference to FIGS. 1 and 2, the adhesive layer 2, and a printed product main body 3.

The printed product main body 3 includes a print base 3a and a printed layer 3b. The label 1 is put on the print base 3a via the adhesive layer 2.

The print base 3a is made of, for example, paper, plastic, wood, glass, or resin. The print base 3a can have a single layer structure or a multilayer structure. The print base 3a can have a layer shape or another shape.

The printed layer 3b is provided on the print base 3a. The printed layer 3b can wholly or only partially cover the print base 3a.

Assume that the above-described invalidation processing is performed for the printed product 100 after its expiration date. This makes it possible to discriminate, for a printed product whose authenticity is unknown, whether the label 1 is reused. That is, it is possible to do authenticity determination for a printed product whose authenticity is unknown. It is therefore possible to discourage a person from committing dishonesty and thus suppress reuse of a label put on an article after the expiration date of the article. As a result, counterfeiting of the printed product 100 can be suppressed.

EXAMPLES

Examples of the present invention will be described below.

Example 1

The label 1 described with reference to FIGS. 1 and 2 was manufactured by the following method.

First, a coated board was prepared as the base 11. Next, india ink (Fine Star R92 Black: available from Toyo Ink) was applied to part of one major surface of the base 11 using a bar coater such that the dried film thickness became 2 μm. The light absorption layer 15 was formed in this way.

An ink A having a composition to be described below was applied onto the light absorption layer 15 using a bar coater such that the dried film thickness became 10 μm. The light scattering layer 12 was formed in this way.

An ink B having a composition to be described below was printed on the light scattering layer 12 to form a one-dimensional code pattern using an offset printing press. The pattered optical function layer 13 was formed in this way. The label is thus completed.

[Composition of Ink A]
Ropaque OP-84J (available from Dow Chemical Company)
25 parts by mass
Acrylic emulsion polymer
2.5 parts by mass
Water
30 parts by mass

[Composition of Ink B]
Near infrared absorbing dye YKR-3081 (available from Yamamoto Chemicals)
5 parts by mass
FD Karton ACE medium: available from Toyo Ink)
95 parts by mass When the thus obtained label 1 was observed by a camera including a bandpass filter for passing a near infrared wavelength, the one-dimensional code as shown in FIG. 1 could be read.

Invalidation processing was then performed for the label 1. More specifically, a pressure of 1 kgf/cm$^2$ and heat of 160° C. were applied to the entire surface of the label 1. When the label 1 was observed by the above camera after the processing, the one-dimensional code pattern as shown in FIG. 1 could not be read.

Example 2

The label 1 described with reference to FIGS. 6 and 7 was manufactured by the following method.

First, wood-free paper was prepared as the base 11. Next, india ink (Fine Star R92 Black: available from Toyo Ink) was applied to part of one major surface of the base 11 using a bar coater such that the dried film thickness became 2 μm. The light absorption layer 15 was formed in this way.

The above-described ink A was applied onto the light absorption layer 15 using a bar coater such that the dried film thickness became 10 μm. The light scattering layer 12 was formed in this way.

An ink C having a composition to be described below was printed on the light scattering layer 12 using an offset printing press. The optical function layer 13 covering the entire surface of the light scattering layer 12 was formed in this way.

India ink (Fine Star R92 Black: available from Toyo Ink) was printed on the optical function layer 13 to form a one-dimensional code pattern using a gravure proof press. The light absorption pattern 14 was formed in this way. Note that the thickness of the light absorption pattern 14 was 1 μm.

[Composition of Ink C]
Fine Star R181 Red (available from Toyo Ink)
40 parts by mass
Fine Star R235 Yellow (available from Toyo Ink)
35 parts by mass
Fine Star R31 Indigo (available from Toyo Ink)
20 parts by mass
YKR-3081 (available from Yamamoto Chemicals)
5 parts by mass The thus obtained label 1 was observed using camera 1 including a bandpass filter that passes a wavelength in a visible light range, camera 2 including a bandpass filter that passes the second wavelength (850 nm) belonging to the near infrared range, and camera 3 including a bandpass filter that passes the first wavelength (710 nm) belonging to the near infrared range.

Next, invalidation processing of the label 1 was performed under the same conditions as in Example 1. After that, observation was done using cameras 1 to 3 as in the above-described case.

Table 1 shows the results. In the columns of "camera 1", "camera 2", and "camera 3" of Table 1, "○" indicates that the one-dimensional code was observable, and "x" indicates that the one-dimensional code was not observable. In the column of "authenticity determination", "○" indicates an authentic article, and "x" indicates a counterfeit that cannot be reused.

TABLE 1

| Invalidation processing | Camera 1 | Camera 2 | Camera 3 | Authenticity determination |
|---|---|---|---|---|
| Before | x | ○ | x | ○ |
| After | x | x | x | x |

As shown in Table 1, before the invalidation processing, the one-dimensional code was observable by camera 2 but not observable by cameras 1 and 3. On the other hand, after the invalidation processing, the one-dimensional code was not observable by any of cameras 1 to 3. As described above, the authenticity of the label 1 could be judged by detecting the difference in the spectral characteristic of the label 1 before and after the invalidation processing.

What is claimed is:

1. A label comprising:
an optical function layer configured to pass light of a certain wavelength;
a light absorption layer facing the optical function layer and configured to absorb the light of the wavelength; and
a light scattering layer intervening between the optical function layer and the light absorption layer and including hollow bodies configured to scatter the light of the wavelength,
wherein the light scattering layer is configured to raise a transmittance at the wavelength upon receiving external heat,
wherein the light scattering layer is configured to raise a transmittance at the wavelength upon receiving external heat, the label further comprises a light absorption pattern configured to absorb the light of the wavelength, the light absorption pattern intervening between the optical function layer and the light scattering layer or facing the light scattering layer while sandwiching the optical function layer, and the light absorption pattern and the optical function layer have the same color.

2. The label according to claim 1, wherein the light scattering layer raises the transmittance at the wavelength when the hollow bodies are broken.

3. The label according to claim 1, wherein the wavelength is in an infrared range, and the optical function layer comprises a black layer.

4. The label according to claim 3, wherein the wavelength is in a near infrared range, and a transmittance difference for a wavelength in one of a wavelength range of 700 to 800 nm of the near infrared range and a wavelength range of 800 to 1,500 nm of the near infrared range is not less than 10% in the optical function layer.

5. A label comprising: an optical function layer configured to pass light of a certain wavelength; a light absorption layer facing the optical function layer and configured to absorb the light of the wavelength; and a light scattering layer intervening between the optical function layer and the light absorption layer and including hollow bodies configured to scatter the light of the wavelength, wherein the light scattering layer is configured to raise a transmittance at the wavelength upon receiving external heat, the optical function layer comprises a light absorption pattern configured to absorb the light of the wavelength, the light absorption pattern being a colored pattern facing part of the light absorption layer while sandwiching the light scattering layer, and the light absorption layer comprises a colored layer having the same color as the light absorption pattern.

6. An adhesive label comprising:
a label defined in claim 1; and
an adhesive layer facing a major surface of the label on a side of a light absorption layer.

7. A printed product comprising:
a label defined in claim 1;
a print base facing a major surface of the label on a side of a light absorption layer; and
an adhesive layer intervening between the label and the print base and configured to put the label on the print base.

8. An adhesive label comprising:
a label defined in claim 2; and
an adhesive layer facing a major surface of the label on a side of a light absorption layer.

9. An adhesive label comprising:
a label defined in claim 3; and
an adhesive layer facing a major surface of the label on a side of a light absorption layer.

10. An adhesive label comprising:
a label defined in claim 4; and
an adhesive layer facing a major surface of the label on a side of a light absorption layer.

11. An adhesive label comprising:
a label defined in claim 5; and
an adhesive layer facing a major surface of the label on a side of a light absorption layer.

12. A printed product comprising:
a label defined in claim 2;
a print base facing a major surface of the label on a side of a light absorption layer; and
an adhesive layer intervening between the label and the print base and configured to put the label on the print base.

13. A printed product comprising:
a label defined in claim 3;
a print base facing a major surface of the label on a side of a light absorption layer; and
an adhesive layer intervening between the label and the print base and configured to put the label on the print base.

14. A printed product comprising:
a label defined in claim 4;
a print base facing a major surface of the label on a side of a light absorption layer; and
an adhesive layer intervening between the label and the print base and configured to put the label on the print base.

15. A printed product comprising:
a label defined in claim 5;
a print base facing a major surface of the label on a side of a light absorption layer; and
an adhesive layer intervening between the label and the print base and configured to put the label on the print base.

16. A label comprising:
an optical function layer configured to pass light of a certain wavelength;
a light absorption layer facing the optical function layer and configured to absorb the light of the wavelength; and a light scattering layer intervening between the optical function layer and the light absorption layer and including hollow bodies configured to scatter the light of the wavelength, wherein the light scattering layer is configured to raise a transmittance at the wavelength upon receiving external heat, the label further comprises a light absorption pattern configured to absorb the light of the wavelength, and the light absorption pattern and the light absorption layer have the same color.

* * * * *